(12) United States Patent
McGrew (10) Patent No.: US 9,288,186 B2
(45) Date of Patent: Mar. 15, 2016

(54) NETWORK SECURITY USING ENCRYPTED SUBFIELDS

(71) Applicant: CISCO Technology, Inc., San Jose, CA (US)

(72) Inventor: David McGrew, Poolesville, MD (US)

(73) Assignee: Cisco Technology, Inc., San Jose, CA (US)

(*) Notice: Subject to any disclaimer, the term of this patent is extended or adjusted under 35 U.S.C. 154(b) by 76 days.

(21) Appl. No.: 13/909,735

(22) Filed: Jun. 4, 2013

(65) Prior Publication Data

US 2014/0359277 A1 Dec. 4, 2014

(51) Int. Cl.
*H04L 29/06* (2006.01)

(52) U.S. Cl.
CPC .................................. *H04L 63/0245* (2013.01)

(58) Field of Classification Search
CPC ...................... H04L 29/06605; H04L 63/0263; H04L 51/12; H04L 63/0428; H04L 29/06578; H04L 63/0245
USPC ........................................ 713/154; 726/11, 23
See application file for complete search history.

(56) References Cited

U.S. PATENT DOCUMENTS

| | | | | |
|---|---|---|---|---|
| 6,167,445 A * | 12/2000 | Gai et al. | ........................ | 709/223 |
| 8,074,267 B1 * | 12/2011 | Stimpson | ........................ | 726/13 |
| 8,259,722 B1 * | 9/2012 | Kharitonov | .................... | 370/392 |
| 8,850,583 B1 * | 9/2014 | Nelson et al. | .................... | 726/23 |
| 2003/0115328 A1 * | 6/2003 | Salminen et al. | ............. | 709/225 |
| 2003/0118038 A1 * | 6/2003 | Jalava et al. | ..................... | 370/401 |
| 2003/0120955 A1 * | 6/2003 | Bartal et al. | ................... | 713/201 |
| 2003/0149766 A1 * | 8/2003 | Syvanne et al. | ................ | 709/224 |
| 2004/0044908 A1 * | 3/2004 | Markham et al. | .............. | 713/201 |
| 2004/0172550 A1 * | 9/2004 | Sai | ................................ | 713/193 |
| 2006/0017557 A1 * | 1/2006 | Chung et al. | .................... | 340/515 |
| 2007/0028090 A1 * | 2/2007 | Lopez et al. | ................... | 713/153 |
| 2007/0180227 A1 * | 8/2007 | Akimoto | ........................ | 713/153 |
| 2007/0288743 A1 | 12/2007 | Cam-Winget et al. | | |
| 2008/0222309 A1 * | 9/2008 | Shanbhogue | ................. | 709/250 |
| 2009/0288165 A1 * | 11/2009 | Qiu et al. | ........................ | 726/23 |
| 2010/0064137 A1 * | 3/2010 | McGrew et al. | .............. | 713/168 |
| 2010/0246829 A1 | 9/2010 | McGrew et al. | | |
| 2011/0099631 A1 * | 4/2011 | Willebeek-Lemair et al. | . | 726/23 |
| 2011/0113249 A1 * | 5/2011 | Gelbard et al. | ................ | 713/170 |
| 2012/0144191 A1 * | 6/2012 | Lebovitz et al. | ............... | 713/163 |

OTHER PUBLICATIONS (STIC NPL Snapshot).*

* cited by examiner

*Primary Examiner* — Matthew Smithers
(74) *Attorney, Agent, or Firm* — Cindy Kaplan (57) ABSTRACT

In one embodiment, a method includes receiving from a secure device, an encrypted rule at a first network device, receiving at the first network device, a packet containing at least one encrypted subfield from a second network device, the subfield encrypted based on a key received at the second network device from the secure device, and determining if the encrypted subfield matches the encrypted rule. An apparatus and logic are also disclosed herein.

20 Claims, 8 Drawing Sheets

NETWORK SECURITY USING ENCRYPTED SUBFIELDS

TECHNICAL FIELD

The present disclosure relates generally to communication networks, and more particularly, to network security.

BACKGROUND

Network firewalls use rules to determine which data packets should be allowed, and which should be dropped. In addition to causing a packet to be dropped, a rule might trigger another action on the firewall, such as creating a record in a log. A rule consists of information about the source, destination, network ports, protocols, application type, and data appearing in the packet. When a packet matches the information in a rule, the firewall performs the action associated with the rule on that packet. Rules for matching certain packets and action to be taken on the packets may be sensitive information, such as personal information or government classified information, in which case it is important to hide the content of the rules in order to keep secret the techniques used to generate the rules.

BRIEF DESCRIPTION OF THE FIGURES

Corresponding reference characters indicate corresponding parts throughout the several views of the drawings.

DESCRIPTION OF EXAMPLE EMBODIMENTS

Overview

In one embodiment, a method generally comprises receiving from a secure device, an encrypted rule at a first network device, receiving at the first network device, a packet containing at least one encrypted subfield from a second network device, the subfield encrypted based on a key received at the second network device from the secure device, and determining if the encrypted subfield matches the encrypted rule.

In another embodiment, an apparatus generally comprises a processor for receiving from a secure device, an encrypted rule at a first network device, processing a packet containing at least one encrypted subfield from a second network device, the subfield encrypted based on a key received at the second network device from the secure device, and determining if the encrypted subfield matches the encrypted rule. The apparatus further includes memory for storing the encrypted rule.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Rules used to protect network traffic may be classified. In conventional systems, it is generally unacceptable to enter classified data into commercial non-high-assurance equipment.

The embodiments described herein provide compromise-resilient network security enforcement using encrypted subfields, which allows commercial network security equipment, such as firewalls and IPS/IDS (Intrusion Protection System/Intrusion Detection System) devices to be used to enforce classified network security rules. As described in detail below, target values of packet subfields may be encrypted by a trusted device and given to the commercial device in an encrypted form, as part of the configuration information. A partly trusted device encrypts the packet subfields on the fly, creating a partly-encrypted version of the packet that is inspected by the commercial device. The embodiments ensure that the compromise of a single network device does not compromise the confidentiality of the rules.

Figure 1:
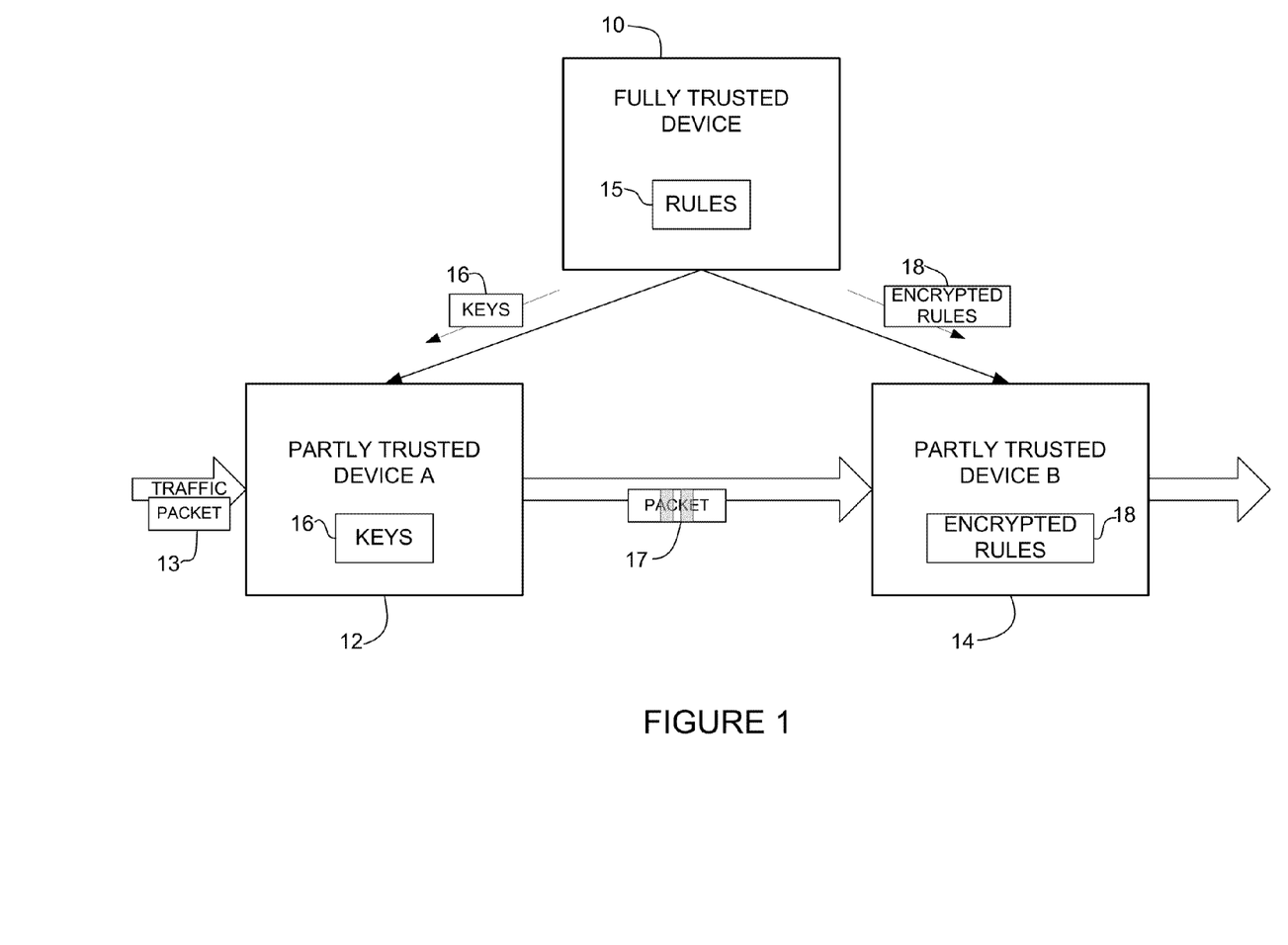
FIG. 1 illustrates an example of a network in which embodiments described herein may be implemented.

Referring now to the figures, and first to FIG. 1, an example of a network in which embodiments described herein may be implemented is shown. For simplification only a small number of nodes are shown. The network includes a fully trusted device (secure device) 10 in communication with two partly trusted devices (A and B) 12, 14.

The fully trusted device 10 may be, for example, an offline management workstation, secure remote management device, or any other secure device. Network device 10 stores rules 15 for matching certain packets and actions to be taken on the packets (referred to as signatures). The rules 15 may be used to protect at least some of the network traffic. As previously discussed, it may be important to hide the content of the rules in order to keep secret the techniques used to generate the rules and the actual rules. The trusted device 10 encrypts target values in the rule with a secret key and transmits the encrypted rule 18 to partly trusted device B, and the key 16 to partly trusted device A. The secure device 10 may transmit one or more keys 16 and one or more encrypted rules 18. Different keys or rules may be used for encryption and inspection of different traffic flows, for example.

Data (e.g., private keys 16, encrypted rules 18) transmitted from the fully trusted device 10 to the partly trusted devices 12, 14 is sent via secure management channels. The secure management channel may use, for example, SSH (Secure Shell), HTTPS (Hypertext Transfer Protocol Secure), or any other secure communication protocol. In addition, the data can be moved onto the partly trusted devices via a physically secure interface, for instance by removable storage media.

Network device A stores the security key 16 received from the secure device 10 and uses the key to encrypt traffic received at the device. As described below, the network device A encrypts one or more subfields of packets 13 received at the network device. As described below, a subfield may be an IP address, network port, network protocol number, or any other well-known data that can appear in a packet, or it may be only part of the subfields described above. For example, a subfield may consist of the first 16 bits of the 32-bit source address that appears in an IP packet. Network device A may be any device configured for performing encryption on received traffic (packet 13) and transmitting the encrypted traffic (packet 17) to network device B.

Network device B stores the encrypted rules (e.g., ciphertexts) 18 received from the secure device 10 and uses the rules determine if received traffic matches the rules. Network device B may be, for example, commercial network security equipment such as a firewall, IPS device, IDS device, or other network security device.

The network devices 12, 14 may be physically separate devices or the devices may be co-located (e.g., different blades on same blade server, different line cards on same physical device). The functions provided by each of the network devices 12, 14 may also be distributed across more than one network device.

Data flow paths between the nodes 10, 12 and 14 may include any number or type of intermediate nodes (e.g., routers, switches, gateways, or other network devices) and communication links, which facilitate passage of data between the nodes. The traffic may traverse one or more networks (e.g., local area network, metropolitan area network, wide area network, enterprise network, Internet, intranet, radio access network, public switched network, or any other network).

The example shown in FIG. 1 illustrates the flow of traffic between network devices 12 and 14. Network device A receives packet 13 and encrypts one or more subfields of the packet. Network device A encrypts the subfields using information (e.g., secret key) 16 received from fully trusted device 10 and then transmits encrypted packet 17 to network device B. Network device B uses the encrypted rule (or rules) 18 received from fully trusted device 10 to inspect the packet 17. In one embodiment, network device B may filter the traffic received from network device A based on results of the inspection. For example, network device B may forward the encrypted packet 17 if the encrypted subfield matches the rule 18, or filter the packet if the encrypted subfield does not match the rule. Filtering may include, for example, dropping, modifying (e.g., editing or fixing one or more fields, stripping files), redirecting (e.g., putting blocked packets on a particular VLAN (Virtual Local Area Network)), or marking the packet.

In another embodiment, network device B transmits inspection results (e.g., matching information). As described below with respect to the examples shown in FIGS. 6 and 7, network device B may forward inspection results to another device (e.g., management station, forwarding device (router, switch) for each packet, group of packets, traffic stream, or class, for example.

In yet another embodiment, network device B forwards or filters the packet and transmits inspection results to another device.

It is to be understood that the network shown in FIG. 1 and described herein is only an example and that the embodiments may be implemented in networks having different network topologies or network devices, or utilizing different protocols, without departing from the scope of the embodiments.

Figure 2:
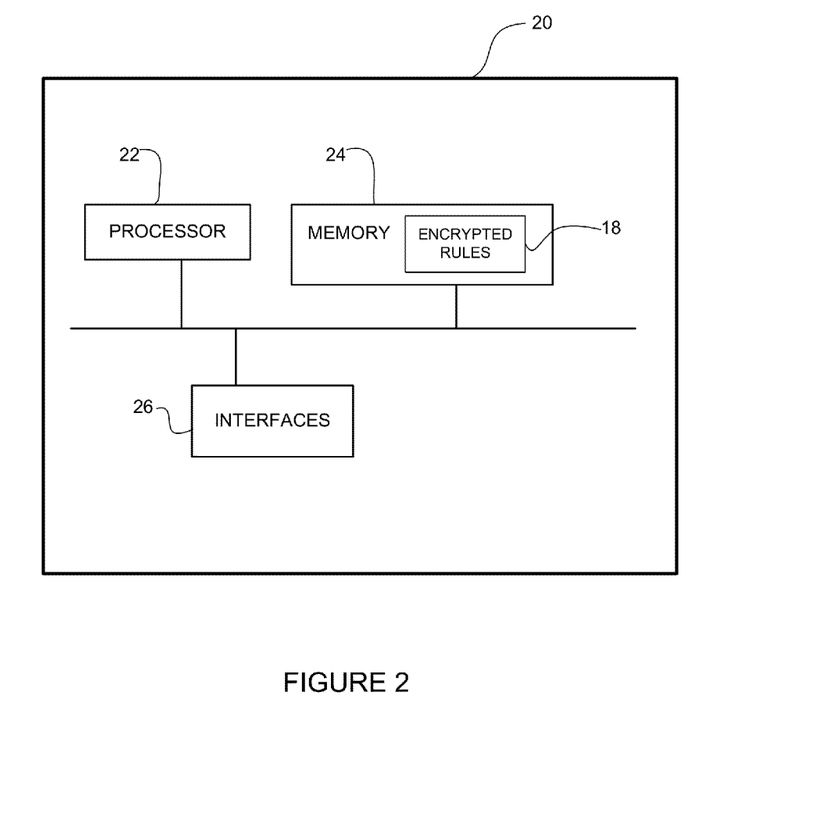
FIG. 2 depicts an example of a network device useful in implementing embodiments described herein.

FIG. 2 is a block diagram illustrating an example of a network device 20 (e.g., network device B in FIG. 1) that may be used to implement embodiments described herein. The network device 20 is a programmable machine that may be implemented in hardware, software, or any combination thereof. The network device 20 includes a processor 22, memory 24 and interfaces 26. Memory 24 may be a volatile memory or non-volatile storage, which stores various applications, modules, and data for execution and use by the processor 22. Memory 24 may store, for example, encrypted rules 18.

Logic may be encoded in one or more tangible computer readable media for execution by the processor 22. For example, the processor 22 may execute codes stored in a computer-readable medium such as memory 24. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The interfaces 26 may comprise any number of interfaces (linecards, ports) for receiving data or transmitting data to other devices.

The network device 20 may further include any suitable combination of hardware, software, algorithms, processors, devices, components, or elements operable to facilitate the capabilities described herein.

Figure 3:
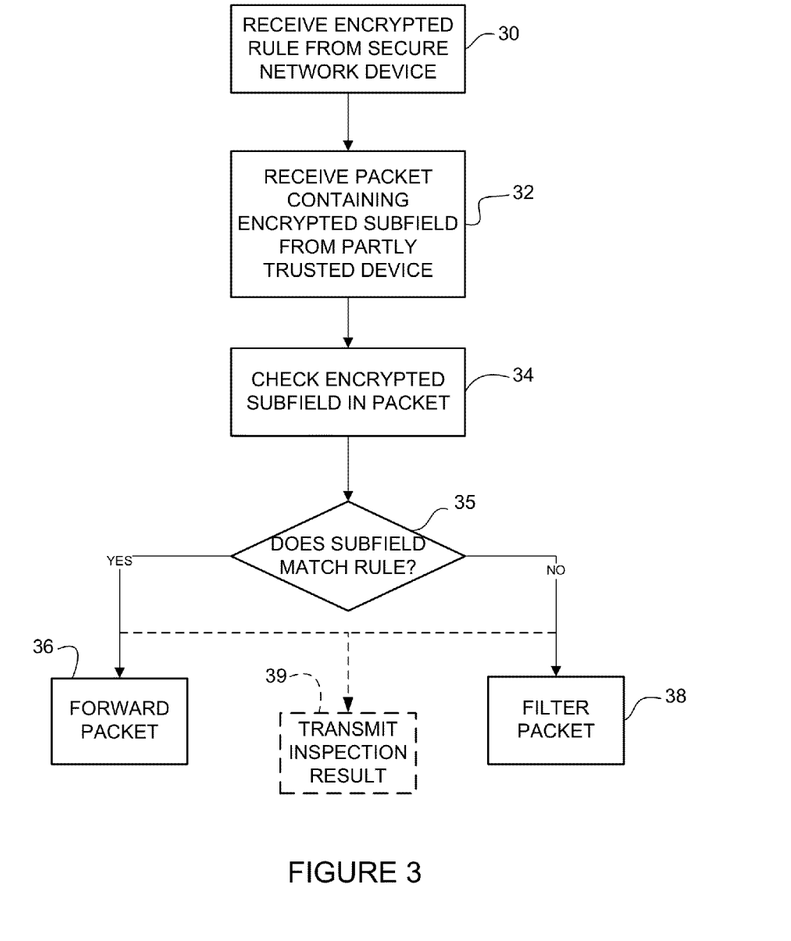
FIG. 3 is a flowchart illustrating an overview of a process for network security using encrypted subfields, in accordance with one embodiment.

FIG. 3 is a flowchart illustrating an overview of a process for network security using encrypted subfields, in accordance with one embodiment. At step 30, a first network device (e.g., partly trusted device B in FIG. 1) receives an encrypted rule 18 from secure device 10. Network device B then receives traffic from network device A (second network device) (step 32). The traffic includes one or more packets 17 comprising at least one encrypted subfield. As described above, network device A receives the secret key 16 from secure network device 10 and uses the key to encrypt one or more subfields of the packet, and then forwards the resulting packet to network device B. Network device B inspects the packet 17 to determine if the encrypted subfield in the packet matches the encrypted rule 18 received from secure device 10 (steps 34 and 35). If there is a match between the subfield and the encrypted rule, the packet is forwarded (steps 35 and 36). If the subfield does not match the rule, the packet is filtered (step 38). As previously discussed, network device B may transmit inspection results (step 39) instead of (or in addition to) forwarding or filtering the packet.

It is to be understood that the process illustrated in FIG. 3 and described above is only an example and that steps may be added, removed, or modified, without departing from the scope of the embodiments.

Figure 4:
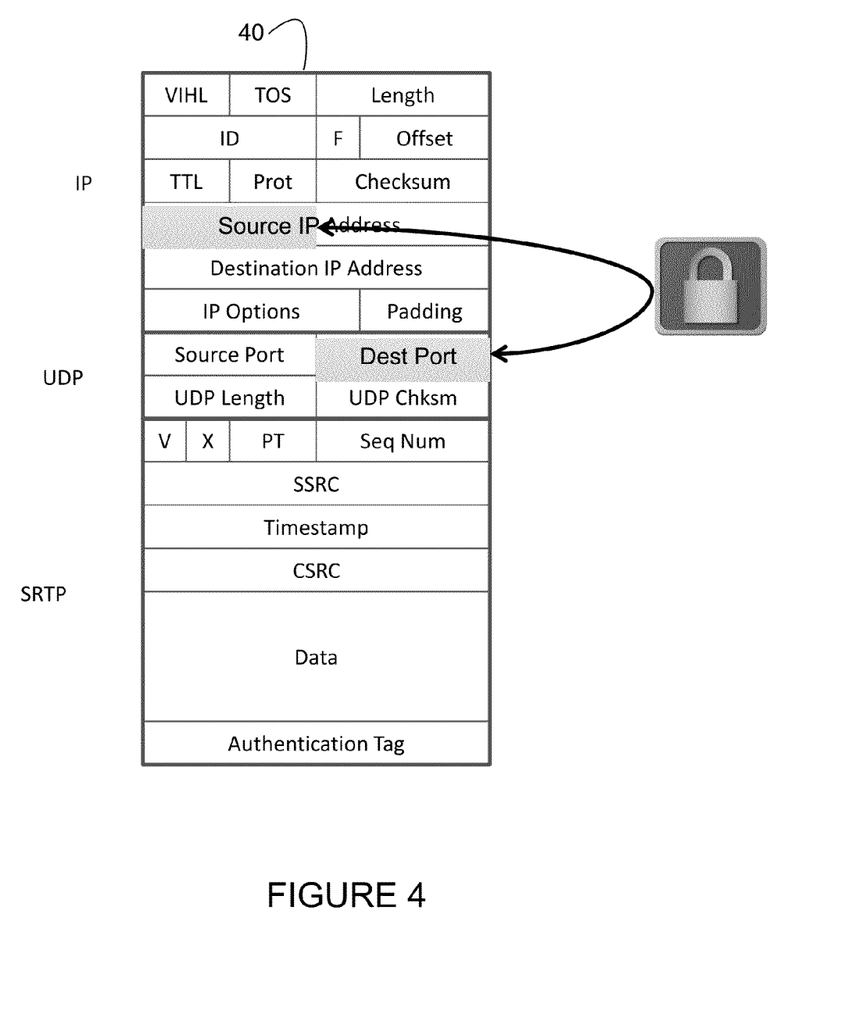
FIG. 4 is an example of subfield encryption for use in the process shown in FIG. 3, in accordance with one embodiment.

FIG. 4 illustrates an example of a packet 40 with encrypted subfields. In this example, subfields containing the source IP address and destination port are encrypted. The rule may be, for example, if srcip==44.1.0.0 and dest.port==555 then drop. The entire IP address and destination port or a portion thereof may be encrypted. It is to be understood that the term 'subfield' as used herein may refer to any field, element, header, address, port, or identifier, or portion thereof. For example, the subfield may comprise an entire address or port field, portion of the address or port field, an XML (Extensible Markup Language) element, or URL (Uniform Resource Locator) file name. The packet may include any number or type of fields and any subfield may be encrypted as long as both devices A and B use the same method for parsing packets into subfields.

As previously described, the network security system may be implemented using any number of network devices and configurations. The following describes examples of network devices and topologies that may be used to implement the embodiments described herein.

Figure 5:
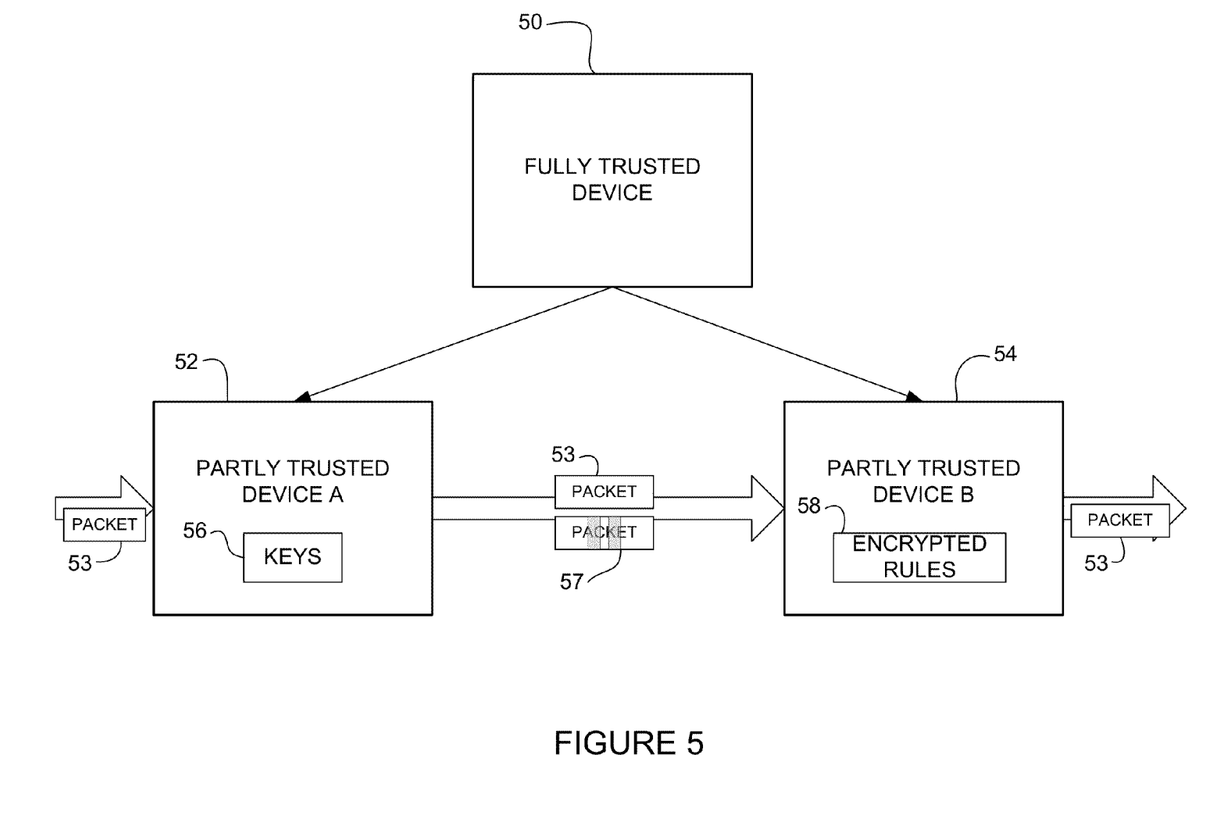
FIG. 5 illustrates stream duplication in the network of FIG. 1, in accordance with one embodiment.

FIG. 5 illustrates an example of an embodiment in which stream duplication is used between the partly trusted devices. The system includes fully trusted device 50 in communication with partly trusted devices 52 (A) and 54 (B). The fully trusted device 50 transmits one or more private keys 56 to network device A and one or more encrypted rules 58 to network device B. In this example, network device A forwards both unencrypted packet 53 and encrypted packet 57 to network device B. Network device B makes a decision on the encrypted packet 57 based on the encrypted rules 58 and if the encrypted subfields match the rules, forwards the unencrypted packet 53.

Figure 6:
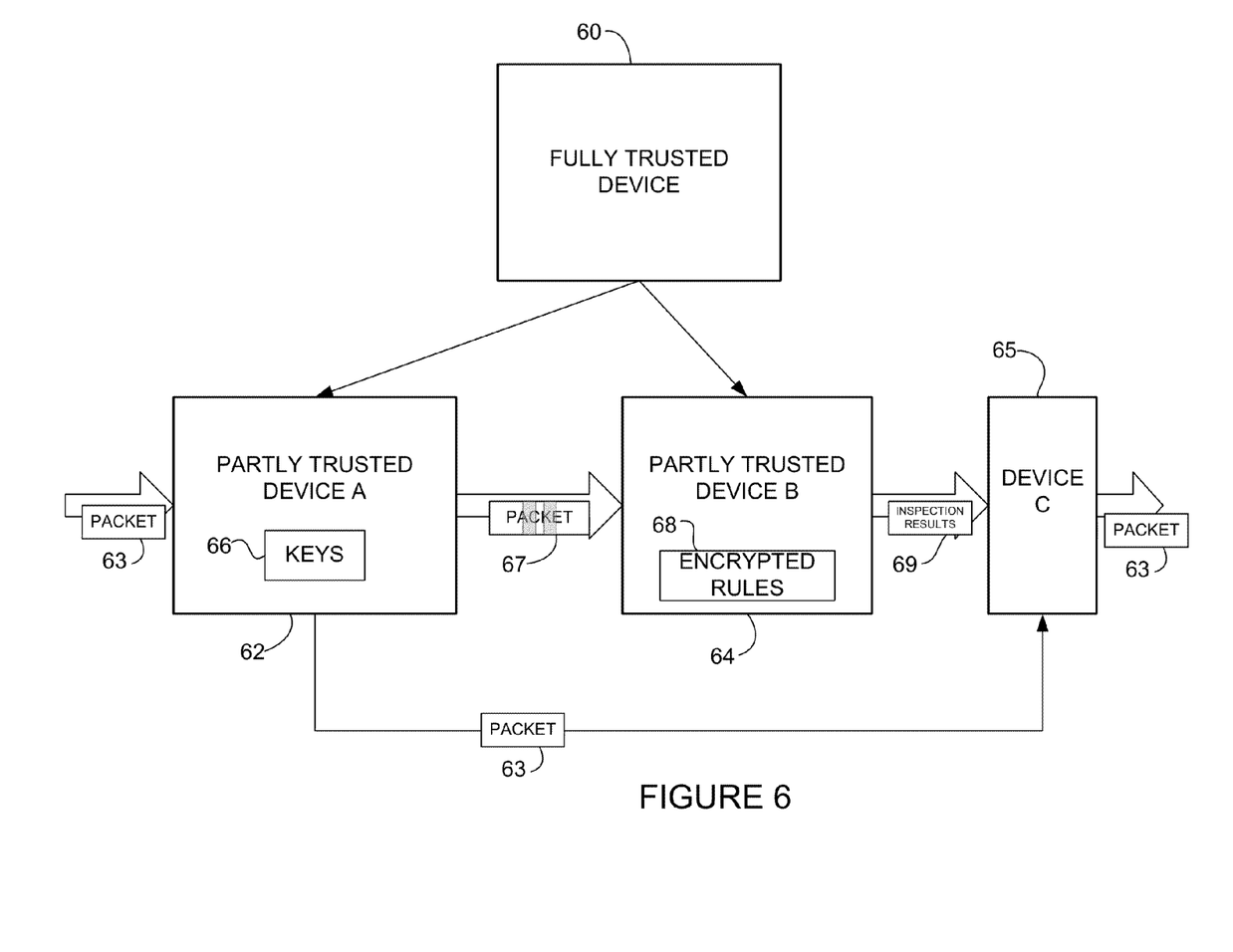
FIG. 6 illustrates an example of a firewall in the network of FIG. 1, in accordance with one embodiment.

FIG. 6 illustrates an embodiment in which network device B does not see plaintext (unencrypted) packet 63. As described above, the system includes fully trusted device 60 in communication with partly trusted devices 62 (A) and 64 (B). The system further includes a third network device 65 (C) operable to receive inspection results from network device B and forward or filter the plaintext packet 63 received from network device A. Network devices B and C may be physically separate devices or co-located. One or more functions of network devices B and C may be performed by a firewall. The fully trusted device 60 transmits one or more private keys 66 to network device A and one or more encrypted rules 68 to network device B. In this example, network device A forwards encrypted packet 67 to network device B. Network device B makes a decision on the encrypted packet and forwards an indication of a match or no-match (inspection results) 69 to network device C (65) (third network device). Network device A also forwards the unencrypted packet 63 to network device C, which forwards the unencrypted packet 63 if network device B indicates that the rules matched the corresponding encrypted subfields in packet 67. If the encrypted subfields in packet 67 do not match the encrypted rules 68, the packet is filtered by network device C.

Figure 7:
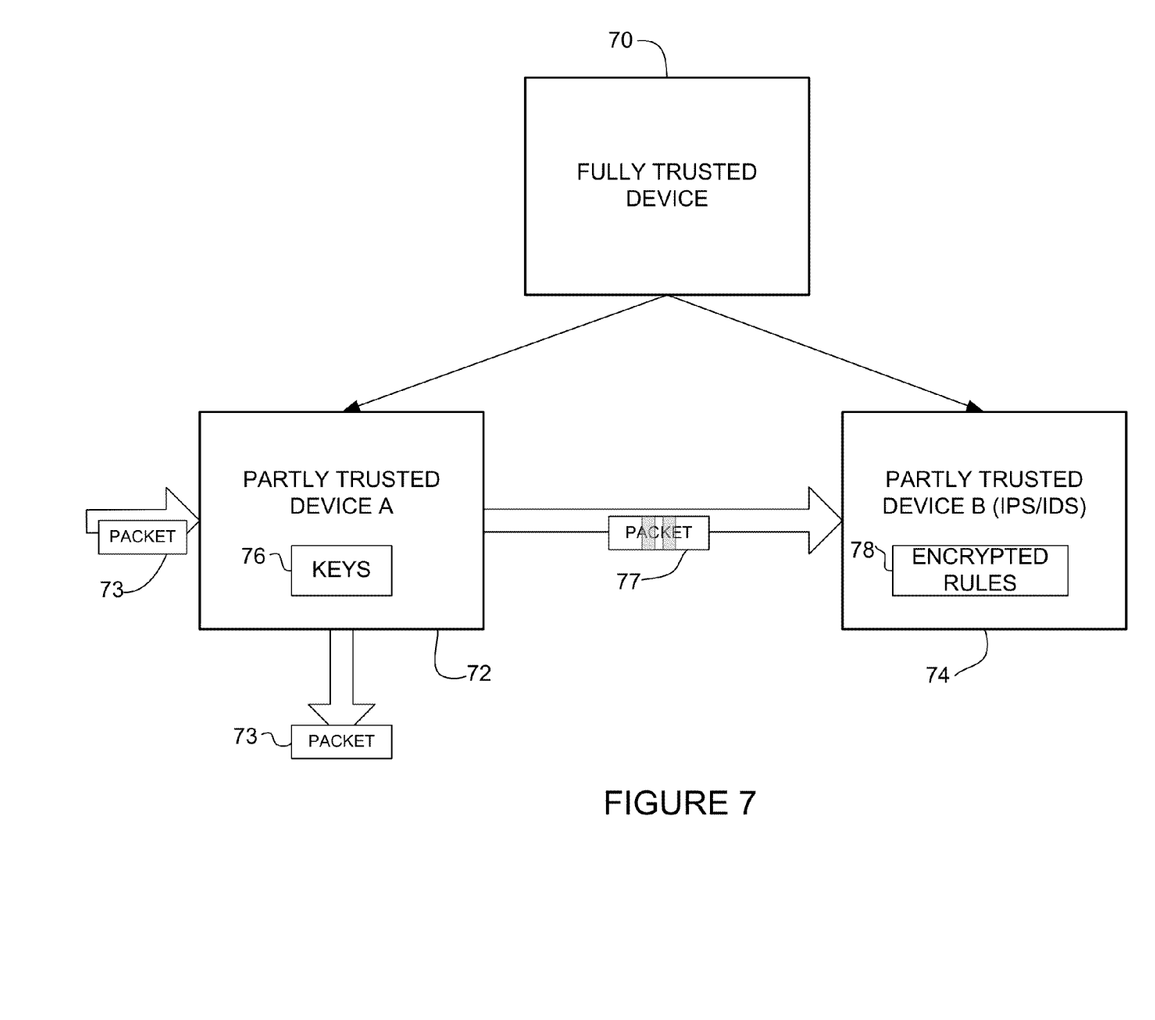
FIG. 7 illustrates an example of an intrusion protection or detection system in the network of FIG. 1, in accordance with one embodiment.

FIG. 7 illustrates an embodiment in which network device B is an IDS (Intrusion Detection System) or IPS (Intrusion Protection System) device. The system includes fully trusted device 70 in communication with partly trusted devices 72 (A) and 74 (B). The fully trusted device 70 transmits one or more private keys 76 to network device A and one or more encrypted rules 78 to network device B. Network device A encrypts received packet 73 and forwards encrypted packet 77 to network device B. Network device A also forwards the unencrypted packet along its network path to a separate device (not shown). Network device B applies IDS/IPS with encrypted target values to the encrypted packet 77. Network device B collects inspection results for network traffic and sends the information to a management station (not shown) configured to alert the network of any intrusion attempts.

Figure 8:
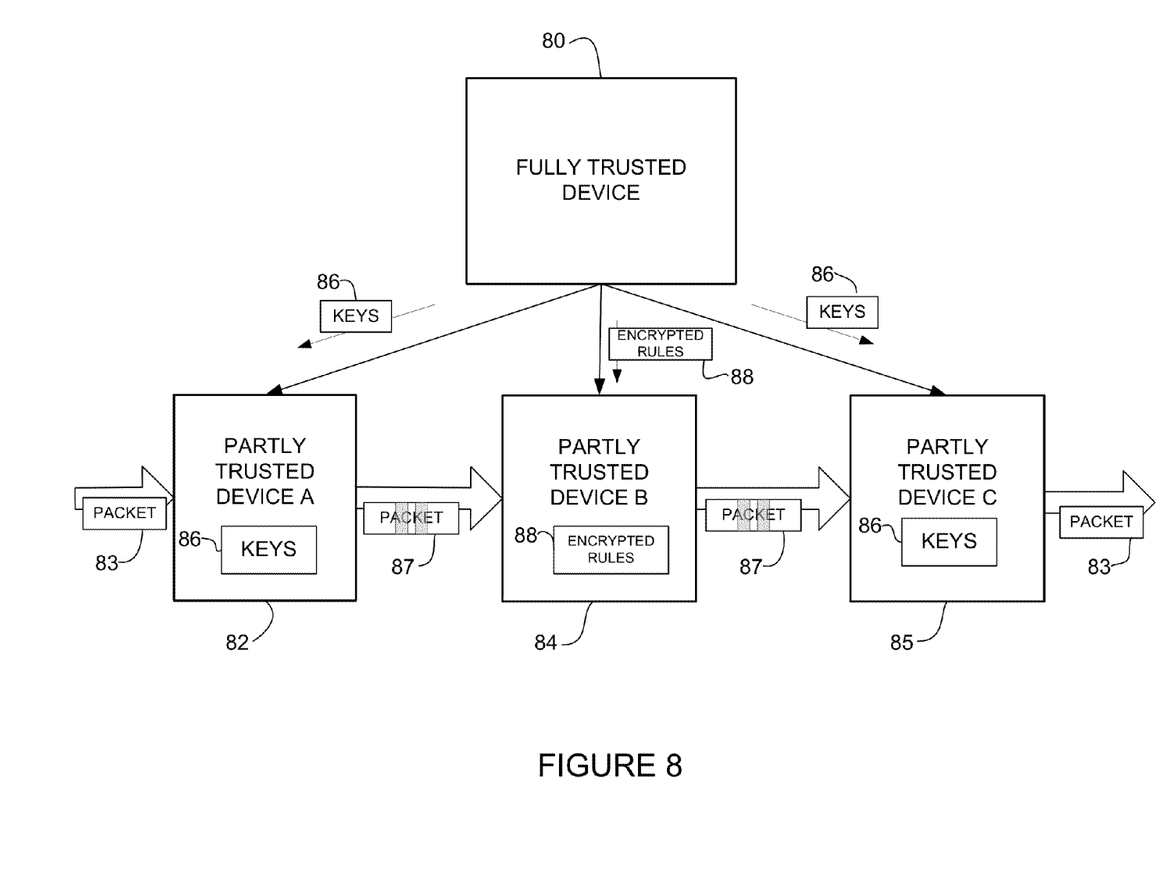
FIG. 8 illustrates the network of FIG. 1 with a decryption device, in accordance with one embodiment.

The system of FIG. 8 includes fully trusted device 80 in communication with partly trusted devices 82 (A), 84 (B), and 85 (C). The fully trusted device 80 transmits one or more private keys 86 to network device A and network device C. The fully trusted device 80 also transmits one or more encrypted rules 88 to network device B. Network device A encrypts received packet 83 and transmits encrypted packet 87 to network device B. Network device B inspects the encrypted packet 87 and if the encrypted subfields of the packet match the rules 88, forwards the encrypted packet to network device C. Network device C uses the key 86 received from the fully trusted device 80 to decrypt the packet and then forwards the plaintext packet 83. Network device C decrypts the subfields using the same parsing and encryption values as network device A.

It is to be understood that the embodiments shown in FIGS. 5-8 are only examples and that other network devices and network configurations may be used, without departing from the scope of the embodiments.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
receiving from a secure device at a first network device, an encrypted rule encrypted with a key at the secure device;
storing the encrypted rule at the first network device, wherein content of the rule is hidden from the first network device;
receiving at the first network device, a packet containing at least one encrypted subfield from a second network device, said subfield encrypted based on the key received at the second network device from the secure device; and
processing the packet, wherein processing comprises using the encrypted rule to inspect the packet and determine if said encrypted subfield in the packet matches said encrypted rule received from the secure device.

2. The method of claim 1 wherein the first network device comprises an intrusion protection or detection system.

3. The method of claim 1 wherein the first network device comprises a firewall.

4. The method of claim 1 further comprising forwarding the packet if said encrypted subfield matches said encrypted rule and filtering the packet if said encrypted subfield does not match said encrypted rule.

5. The method of claim 4 wherein forwarding the packet comprises forwarding the packet to a third network device configured to decrypt the packet based on the key received from the secure device, and forward the decrypted packet.

6. The method of claim 4 wherein filtering comprises dropping, marking, redirecting, or modifying the packet.

7. The method of claim 1 wherein determining comprises inspecting the packet and further comprising transmitting inspection results.

8. The method of claim 7 wherein said inspection results are transmitted to a third network device configured to forward an unencrypted packet received from the second network device.

9. The method of claim 1 further comprising receiving an unencrypted packet from the second network device and forwarding the unencrypted packet if said encrypted subfield matches said encrypted rule.

10. An apparatus comprising:
a processor for receiving from a secure device, an encrypted rule at a first network device, the rule encrypted with a key at the secure device, storing said encrypted rule, wherein content of the rule is hidden at the apparatus, processing a packet containing at least one encrypted subfield from a second network device, said subfield encrypted based on a key received at the second network device from the secure device, and determining if said encrypted subfield matches said encrypted rule; and
memory for storing said encrypted rule.

11. The apparatus of claim 10 wherein the apparatus comprises an intrusion protection or detection system.

12. The apparatus of claim 10 wherein the apparatus comprises a firewall.

13. The apparatus of claim 10 wherein the processor is further configured to forward the packet if said encrypted subfield matches said encrypted rule and filter the packet if said encrypted subfield does not match said encrypted rule.

14. The apparatus of claim 13 wherein the processor is configured to transmit the packet to a third device configured to decrypt the packet based on the key received from the secure device and forward the decrypted packet.

15. The apparatus of claim 10 wherein determining comprises inspecting the packet and wherein the processor is configured to transmit inspection results.

16. The apparatus of claim 15 wherein the processor is configured to transmit said inspection results to a third network device configured to forward an unencrypted packet received from the second network device.

17. The apparatus of claim 10 wherein the processor is further configured to forward an unencrypted packet received from the second network device if said encrypted subfield matches said encrypted rule.

18. The apparatus of claim 10 wherein the apparatus further comprises the second network device.

19. Logic encoded on one or more non-transitory computer readable media for execution and when executed configured to:
- store an encrypted rule received from a secure device at a first network device, said encrypted rule encrypted with a key at the secure device;
- store the encrypted rule at the first network device, wherein content of the rule is hidden from the first network device;
- inspect a packet received from a second network device and containing at least one encrypted subfield, said subfield encrypted based on a key received at the second network device from the secure device; and
- process the packet to determine if said encrypted subfield matches said encrypted rule received from the secure device.

20. The logic of claim 19 further configured to transmit the packet, if said encrypted subfield matches said encrypted rule, to a third network device configured to decrypt the packet based on the key received from the secure device.

* * * * *